(12) United States Patent  (10) Patent No.: US 6,364,238 B1
Weller  (45) Date of Patent: Apr. 2, 2002

(54) BELT RETRACTOR WITH FORCE LIMITER

(75) Inventor: Hermann-Karl Weller, Alfdorf (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/580,334

(22) Filed: May 26, 2000

(30) Foreign Application Priority Data

May 27, 1999 (DE) ..................... 299 09 252 U

(51) Int. Cl.[7] ................ B65H 75/48; B60R 22/40
(52) U.S. Cl. ................ 242/379.1; 242/383.2
(58) Field of Search .................... 242/379.1, 383.2; 280/805, 806; 297/470, 471, 472

(56) References Cited

U.S. PATENT DOCUMENTS

| 3,952,967 | A | * | 4/1976 | Barile et al. | 242/107.4 |
|---|---|---|---|---|---|
| 5,738,293 | A | * | 4/1998 | Fohl | 242/374 |
| 5,887,814 | A | * | 3/1999 | Matsuki et al. | 242/379.1 |
| 6,105,893 | A | * | 8/2000 | Schmidt et al. | 242/374 |
| 6,158,685 | A | * | 12/2000 | Kielwein et al. | 242/383.2 |
| 6,216,972 | B1 | | 4/2001 | Rohrle | |

FOREIGN PATENT DOCUMENTS

| DE | 4227781 A1 | | 2/1994 |
|---|---|---|---|
| DE | 19609524 A1 | | 9/1997 |
| DE | 29816280 U1 | | 3/1999 |
| WO | WO-97/33778 | * | 9/1997 |

* cited by examiner

Primary Examiner—Christopher P. Ellis
Assistant Examiner—Joseph C Rodriguez
(74) Attorney, Agent, or Firm—Tarolli, Sundheim, Covell, Tummino & Szabo L.L.P.

(57) ABSTRACT

An assembly comprises a belt retractor for a vehicle safety belt and a force limiter. The belt retractor comprises a belt spool, and the force limiter comprises a housing and a driving part able to be coupled with the belt spool. The assembly comprises a locking catch connected with the driving part, a release mechanism for the locking catch, and a stationary locking toothing into which the locking catch can be caused to engage by the release mechanism. The release mechanism is able to be activated by a relative rotation between the driving part and the housing of the force limiter and, towards an end of this relative rotation, can cause to engage the locking catch into the locking toothing whereby the belt spool is locked against a rotation in a belt webbing withdrawal direction relative to the locking toothing.

15 Claims, 7 Drawing Sheets

BELT RETRACTOR WITH FORCE LIMITER

The invention relates to an assembly of a belt retractor for a vehicle safety belt and of a force limiter.

BACKGROUND OF THE INVENTION

An assembly of a belt retractor for a vehicle safety belt and of a force limiter, the belt retractor having a belt spool and the force limiter having a housing and a driving part which is able to be coupled with the belt spool, is known from German Utility Model 298 16 280. The force limiter serves to make possible a rotation of the belt spool of the belt retractor in the belt webbing unwinding direction contrary to a predetermined moment of rotation, so that belt webbing can be withdrawn from the belt spool, which is available as an additional way to decelerate a vehicle occupant. In this way, force peaks in the vehicle safety belt can be reduced, so that the risk of injury for a vehicle occupant who is to be restrained is lowered.

Generally, in belt retractors which are provided with a force limiter, the problem exists that after a primary impact, in which the force limiting function became effective, it is not desired for further belt webbing to be able to be withdrawn from the belt spool. If further belt webbing were able to be withdrawn from the belt spool, the vehicle occupant could move further forward in a secondary impact following the primary impact. Such a further forward movement could lead for example to the vehicle occupant coming into contact with for example a vehicle steering wheel or with a part of the instrument panel, because the gas bags which are usually used today, after they have become effective in a primary impact, do not provide a sufficient restraining effect for a secondary impact.

Therefore, the problem of the invention consists in further developing an assembly of the type initially mentioned to the effect that after a primary impact, the belt spool is reliably locked so that no further belt webbing can be withdrawn therefrom.

BRIEF DESCRIPTION OF THE INVENTION

The invention provides an assembly comprising a belt retractor for a vehicle safety belt and a force limiter. The belt retractor comprises a belt spool, and the force limiter comprises a housing and a driving part able to be coupled with the belt spool. The assembly comprises a locking catch connected with the driving part, a release mechanism for the locking catch, and a stationary locking toothing into which the locking catch can be caused to engage by the release mechanism. The release mechanism is able to be activated by a relative rotation between the driving part and the housing of the force limiter and, towards an end of this relative rotation, can cause to engage the locking catch into the locking toothing whereby the belt spool is locked against a rotation in a belt webbing withdrawal direction relative to the locking toothing. The process of force limitation, i.e. the withdrawal of belt webbing from the belt spool contrary to a resistance torque, is substantially unchanged in the assembly of the invention compared with the prior art. The release mechanism is in fact activated by the beginning of the force limiting function; the locking catch, however, remains up to the conclusion of the force limiting function in its position in which it does not engage into the locking toothing. Only with the termination of the force limiting function, i.e. when the driving part has come to rest relative to the housing of the force limiter, is the locking catch engaged into the locking toothing, so that no further withdrawal of the belt webbing from the belt spool is possible. Therefore, it is ensured that also in the case of a secondary impact a restraining effect can be provided for the vehicle occupant, no further force limiting function being effective then, however. The disconnection of the force limiting function therefore not only ensures that in the case of a secondary crash only a small forward movement of the vehicle occupant is possible; in addition, advantages occur in the design of the belt retractor and in particular of the force limiter. The force limiter only has to be designed so that it makes possible in a primary impact the withdrawal of the necessary length of belt webbing (approximately 300 mm belt webbing). As in a secondary impact the belt webbing is directly locked and no further force limiting function is effective, the force limiter does not need to be designed so that it also makes possible in addition a withdrawal of belt webbing in this case.

According to a preferred embodiment, provision is made that the locking toothing is arranged on the housing of the force limiter. This results in a particularly compact construction.

According to the preferred embodiment, provision is further made that a locking catch is arranged on the belt spool, which locking catch can be caused to engage into the locking toothing arranged on the driving part, so that the belt spool is coupled with the driving part. This construction makes it possible in a particularly simple manner to use a conventional belt retractor, as is described for example in the German Utility Model 298 12 435, to which reference is made expressly here, in connection with a force limiter as is known from the utility model initially mentioned. The locking catch, which usually serves to lock the belt spool by engagement into a toothing fixed to the frame, now serves to couple the belt spool with the force limiter. When the locking catch is not activated, the belt spool can rotate freely. This corresponds to the usual operation. If, on the other hand, the locking of the belt spool is activated, for example because the acceleration or deceleration of the vehicle exceeds a particular threshold value or the rotational acceleration, acting on the belt spool and brought about by high belt webbing forces, exceeds a particular threshold value, the belt spool is connected with the force limiter via the locking catch. As the force limiter only becomes active on exceeding a predetermined moment of rotation and makes possible a rotation of the driving part relative to the housing, the locking toothing arranged on the driving part acts like a toothing fixed to the housing as long as the moment of rotation applied onto the driving part remains below the value after which the force limiter is active. If, in this state, the moment of rotation acting on the belt spool falls again, the locking catch is released again from the locking toothing and the belt spool can rotate freely. If, on the other hand, the acting moment of rotation exceeds the threshold after which the force limiter is active, a relative rotation is brought about between the driving part of the force limiter and its housing, so that belt webbing from the belt spool is possible contrary to the resistance torque provided by the force limiter.

According to a preferred embodiment of the invention, the release mechanism is arranged on the driving part. In this way, the relative rotation used for activation of the release mechanism can be detected immediately between the driving part and the housing.

Preferably, provision is further made that the locking catch is mounted on the driving part. This provides a very compact construction and a direct transfer of force without detours.

According to a first embodiment, the release mechanism comprises a cage which is rotatable relative to the driving part from an initial position in which the locking catch does not engage into the locking toothing, into an activated position in which the locking catch is caused to engage into the locking toothing. In this way, a particularly compact construction is produced, in particular when the release mechanism comprises a spring which biases the cage from the initial position into the activated position, and when the locking catch is mounted on the driving part. Furthermore, provision can be made that the locking catch is provided with a nose which co-operates with a ramp constructed on the driving part, so that the locking catch, on a rotation of the cage, is caused to engage from the initial position into the position of rest into the locking toothing.

According to the first embodiment, in addition a holding pin is provided, which can hold the release mechanism in the initial position and engages into a mounting in the housing of the force limiter, so that it is sheared off with a relative rotation between the driving part and the housing of the force limiter, whereby the release mechanism is activated. This construction makes it possible in a particularly simple manner to use an occurring relative rotation between the driving part and the housing for activation of the release mechanism.

According to a second embodiment, the locking catch is arranged on a slider, the mass and geometry of which are selected such that the overall mass center of locking catch and slider lies on the side of the rotation axis of the driving part facing away from the locking catch. Deviating from the first embodiment, in which the release mechanism responds substantially as a function of the acceleration values, in this construction the locking catch is actuated as a function of the rotational speed. When the rotational speed is so high that the centrifugal force generated by the overall mass center is greater than the effect of the spring, which attempts to guide the locking catch into the locking toothing, the locking catch is kept at a distance from the locking toothing. As soon as the rotational speed falls below a particular value, the force exerted by the spring exceeds the centrifugal force, so that the locking catch is caused to engage into the locking toothing.

Preferably, in addition, a holding pin is provided, which is arranged on the housing and is elastic, a nose being arranged on the locking catch, against which the holding pin can lie and the locking catch can be kept, contrary to the force exerted by the spring, in the position not engaged into the locking toothing. The holding pin can therefore yield elastically, so that it is not obstructive in the case of a relative rotation between the driving part and the housing. Preferably, a slope is provided on the housing, which slope adjoins the nose of the locking catch and deflects the holding pin outwards when the driving part is rotated relative to the housing. As the holding pin is no longer sheared off, it does not represent a loose part which after activation of the force limiting function could have an intrusive effect inside the housing.

In the second embodiment, provision can be further made that a holding surface is constructed on the housing and a projection is constructed on the locking catch, the projection engaging behind the holding surface when the locking catch is situated in its position not engaged into the locking toothing. The holding surface together with the projection acts in the same direction as the holding pin engaging on the nose, i.e. contrary to the action of the spring. In this way, the action of the spring is compensated in a phase of the relative rotation between the driving part and the housing in which the rotational speed of the driving part is still comparatively low, so that the centrifugal force generated by the overall mass center is likewise comparatively low.

Advantageous developments of the invention will be apparent from the sub-claims.

BRIEF DESCRIPTION OF THE DRAWINGS

The invention is described hereinbelow with reference to a preferred embodiment, which is illustrated in the enclosed drawings, in which.

DETAILED DESCRIPTION OF THE INVENTION

Figure 1:
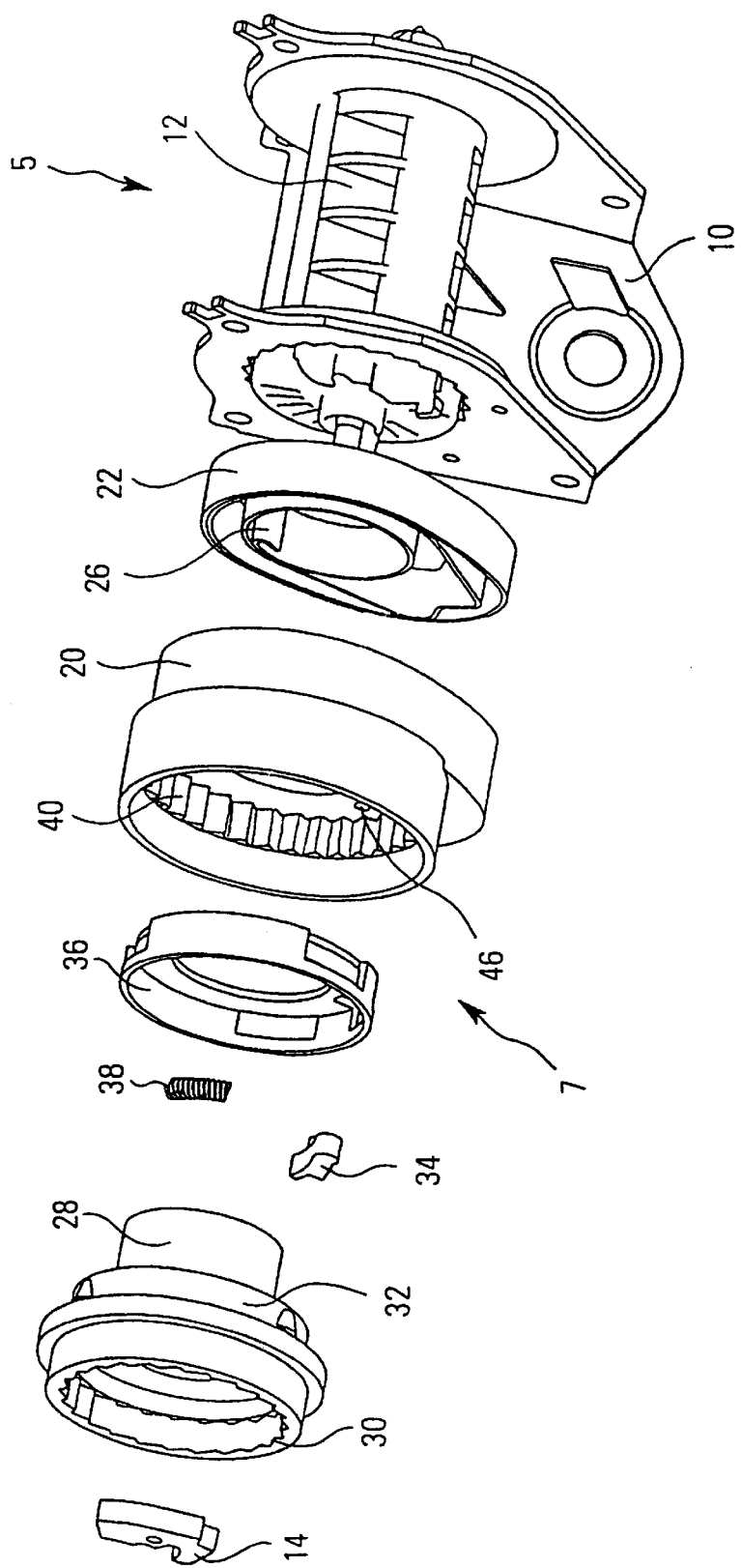
FIG. 1 shows in an exploded view an assembly according to the invention in accordance with a first embodiment.
Figure 2:
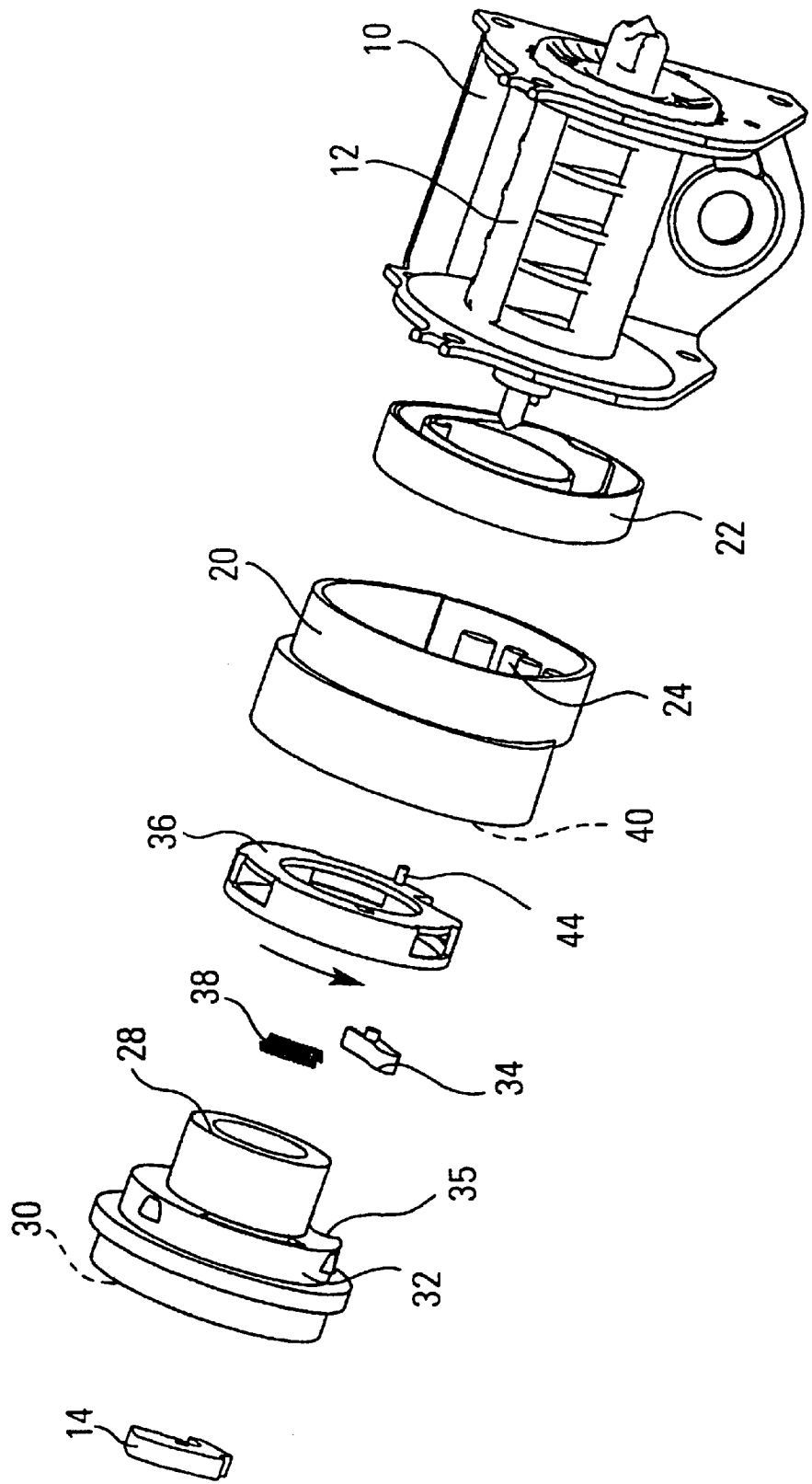
FIG. 2 shows the assembly of FIG. 1 according to the invention in a further exploded view.

In FIGS. 1 and 2, an assembly according to the invention is shown in accordance with a first embodiment. This consists of a belt retractor 5 and a force limiter 7.

The belt retractor 5 has a frame 10 into which a belt spool 12 is rotatably mounted. The belt spool serves in a known manner to receive a vehicle safety belt. For better clarity, the further conventional functional parts of the belt retractor, for example winding spring, locking mechanism, etc. are largely not illustrated in the drawings. Merely a locking catch 14 is shown, which is mounted indirectly on the belt spool 12. For this purpose, a transition piece (not illustrated in the drawings) is provided, on which the locking catch 14 is pivotally mounted. A conventional locking mechanism co-operates with the locking catch 14, which locking mechanism can activate the locking catch in a belt webbing-sensitive or a vehicle-sensitive manner, in order to lock the belt spool. This is further explained later.

The force limiter 7 has a housing 20 which is firmly arranged on the frame 10 of the belt retractor. In this housing 20, a guide path for a metal band 22 is formed, which has several guideways 24. The metal band 22 in the initial state is arranged in the guide path and is suspended by its inner end 26 into a driving part 28. The driving part 28 is held in the housing 20. A relative rotation between the driving part 28 and the housing 20 is only possible if in so doing the metal band 22 is drawn out from the guide path and is wound onto the driving part 28. As regards a detailed description of the construction and of the mode of operation of such a force limiter, reference is to be made to the utility model initially mentioned.

A locking toothing 30 is constructed on the driving part 28, which toothing 30 is associated with the locking catch 14 which is connected with the belt spool 12. The locking catch 14 together with the locking toothing 30 has the function of making possible in normal operation the free rotatability of the belt spool 12 relative to the driving part 28 of the force limiter and then, when the belt spool is to be locked in a vehicle-sensitive or belt webbing-sensitive manner, has the function of ensuring a coupling of the belt spool with the driving part 28 of the force limiter. As soon as the locking catch 14 is caused to engage by the associated locking mechanism into the locking toothing 30, the belt spool can not be rotated further in the belt webbing withdrawal direction, as long as the acting torque lies below the threshold at which the force limiter becomes active. Beneath this threshold in fact the belt spool is supported via the locking catch 14, the locking toothing 30, the metal band 22 suspended on the driving part 28 and the housing 20 of the force limiter on the frame 10 of the belt retractor. If, on the other hand, the acting torque exceeds the maximum permissible holding torque between the housing 20 and the driving part 28 of the force limiter, a relative rotation is brought about between these two parts, so that contrary to the resistance torque then provided, belt webbing can be withdrawn from the belt spool 12.

Hereinbelow, a description is given of how according to the invention towards the end of a force limiting process the belt spool 12 can be locked relative to the frame 10, so that no further withdrawal of belt webbing is possible.

Between the section of the driving part 28 connected with the metal band 22 and the locking toothing 30, a holding section 32 for a locking catch 34 is provided. The locking catch 34 is pivotally mounted on the holding section 32 in a mounting 35 (see FIGS. 2 and 4). On the holding section 32, a cage 36 is rotatably mounted (see also FIGS. 3 and 4), which cage 36 can be rotated between an initial position and an activated position relative to the holding section 32. A compression spring 38 acts on the cage 36, which biases it from the initial position into the activated position.

A nose 37 is constructed on the locking catch 34, which projects into a window 47 which is constructed on the cage 36. The window has in particular a rim 48 running radially and also has a rim 50 running obliquely from the lowest point of the window to the outer periphery of the cage 36.

A locking toothing 40 is firmly arranged on the housing 20 of the force limiter, with which toothing 40 the locking catch 34 can co-operate. This is explained hereinbelow.

When the cage 36 is situated in its initial position, the locking catch 34 is held in a position applied against the holding section 32, in which it is not engaged into the locking toothing 40. In particular, a shoulder 42 is provided on the locking catch 34, which shoulder 42 lies beneath the cage 36 and in this way holds the locking catch 34 in its position, applied against the holding section 32, in the mounting 35.

Figure 3:
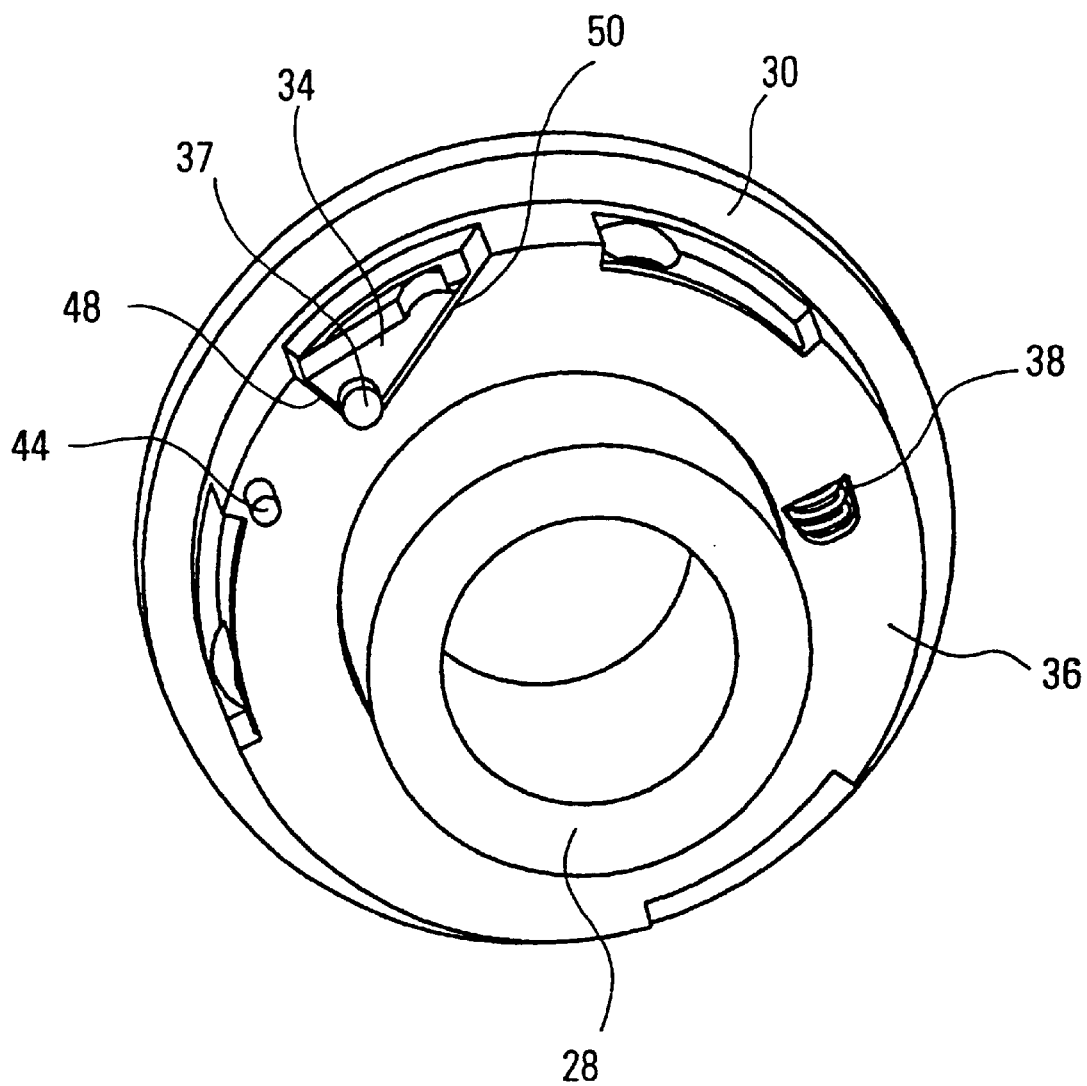
FIG. 3 shows in a perspective view the driving part used in the assembly according to the invention in accordance with the first embodiment together with the release mechanism in a first position.

The cage 36 is held in its initial position, shown in FIG. 3, contrary to the action of the compression spring 38 by means of a holding pin 44, which engages into an associated mounting 46 in the housing of the force limiter. As the driving part 28 is held by the metal band 22 beneath a predetermined torque so as to be secure with respect to rotation relative to the housing 20, the holding pin 44, which is arranged on the cage 36, rotatably mounted on the holding section 32, can rest against the housing so that the cage 36 is held in its initial position.

As soon as a relative rotation between the driving part 28 and the housing 20 occurs owing to the torque exerted by the belt spool 12 onto the driving part 28, the holding pin 44 of the cage 36 is sheared off. Thus, the cage 36 is no longer supported against the housing 20 and it is only exposed to action by the compression spring 38. Nevertheless, the spring 38 is not initially able to turn the cage 36 relative to the holding section 32. This is due to the rotational acceleration of the belt spool and of the driving part 28, acting during the force delimiting process, together with the holding section 32 and the locking toothing 30. The force limiting function becomes effective in that extremely high traction forces act in the vehicle safety belt. These lead to the belt spool 12 being exposed to a high rotational acceleration in the belt webbing unwinding direction. This rotational acceleration acts in the same direction as the force which is exerted by the compression spring 38 onto the cage 36, but is stronger than the action of the compression spring 38, however, as regards its effect. Therefore, the holding section 32 takes with it the cage 36 via the locking catch 34, held in the mounting 35, and the nose 37, which lies against the radial rim 48 of the window 47.

Figure 4:
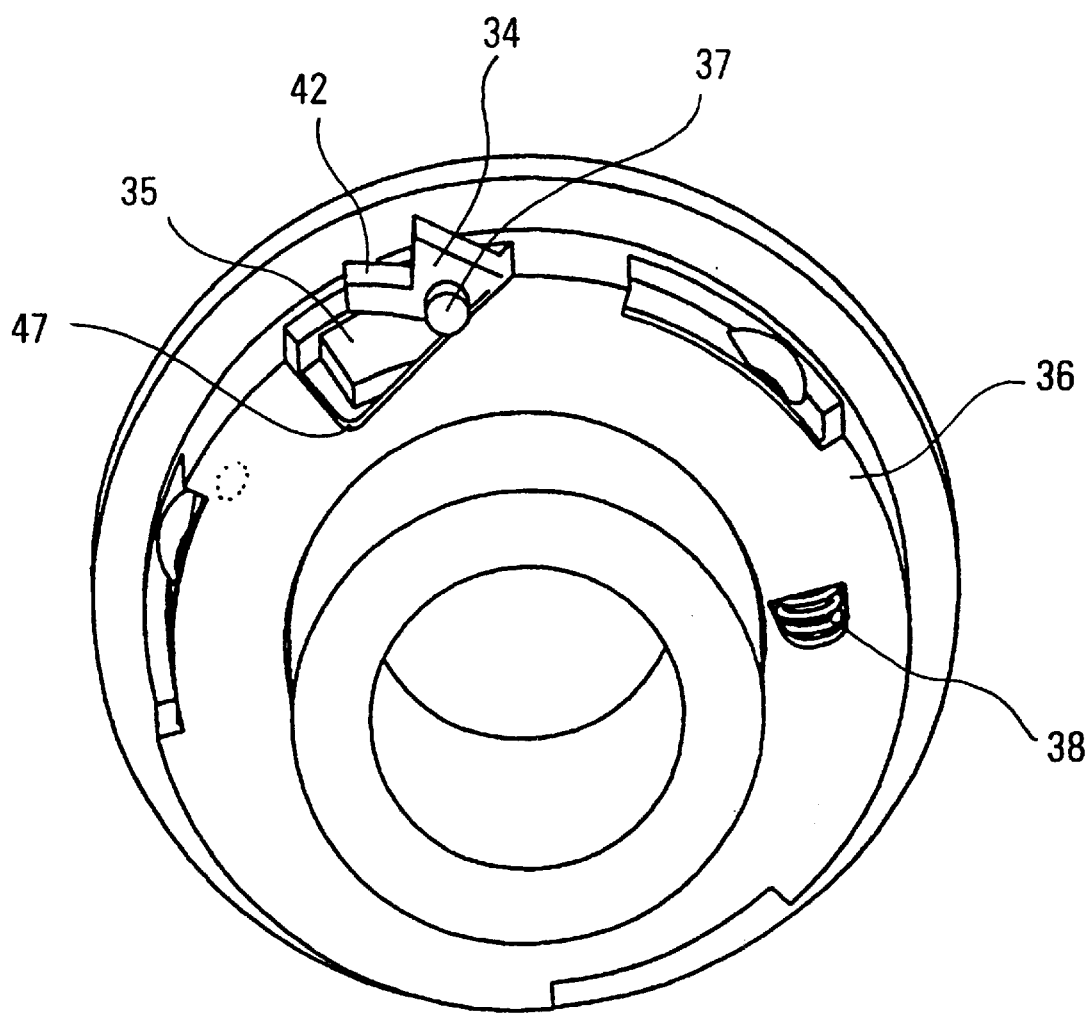
FIG. 4 shows the driving part together with the release mechanism of FIG. 3 in a second position.

Only when the rotational acceleration acting on the driving part 28 decreases, which is the case towards the end of the force limiting function, the compression spring 38 is able to turn the cage 36 relative to the holding section 32. With this rotation, the locking catch 34 is swiveled, by co-operation of the oblique rim 50 of the window 47 with the nose 37 from its position applied against the holding section 32 into a position engaged into the locking toothing 40. This position is shown in FIG. 4. In this position of the locking catch 34, a rotation of the belt spool 12 in the belt webbing unwinding direction is not possible, because the belt spool is secured relative to the frame 10 via the locking catch 14, the locking toothing 30, the holding section 32, the locking catch 34, the locking toothing 40 and the housing 20 of the force limiter.

In this way, it is ensured that automatically at the end of a force limiting process a locking of the belt spool relative to the frame takes place, so that for example in the case of a secondary impact, no more belt webbing can be withdrawn from the belt spool.

Although the assembly according to the invention is described in connection with a force limiter which uses a metal band which is drawn through a guideway, of course a force limiter can also be used in which for example a torsion rod is used for force limiting. Also in the case of such a force limiter, a driving part is present (for example in the region of the connection of the torsion rod with the belt spool), which is exposed to such an acceleration in the force limiting process that a relative rotation of the cage arranged on it is only possible when the force limiting process is substantially completed.

Figure 5:
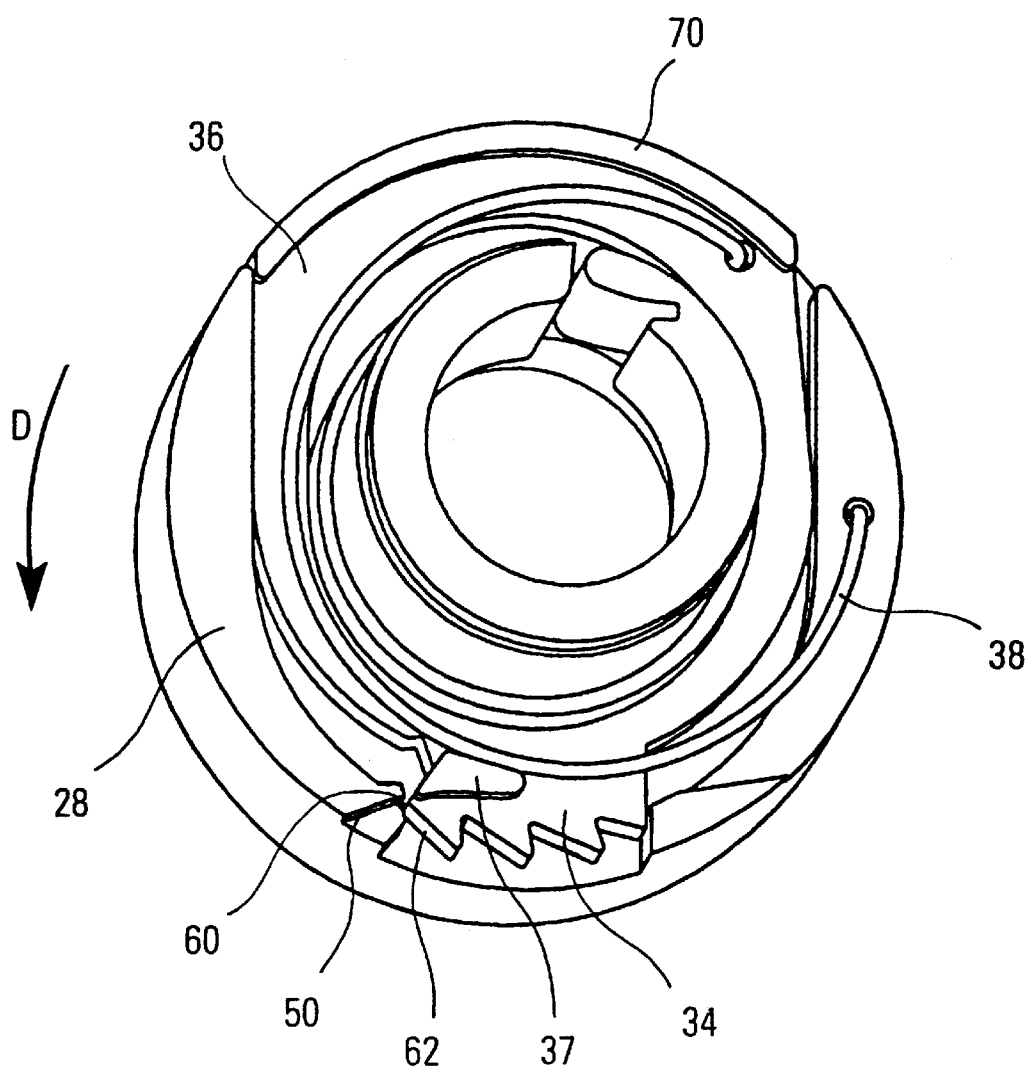
FIG. 5 shows in a perspective view the driving part used in an assembly according to the invention in accordance with a second embodiment together with the release mechanism in a first position.
Figure 6:
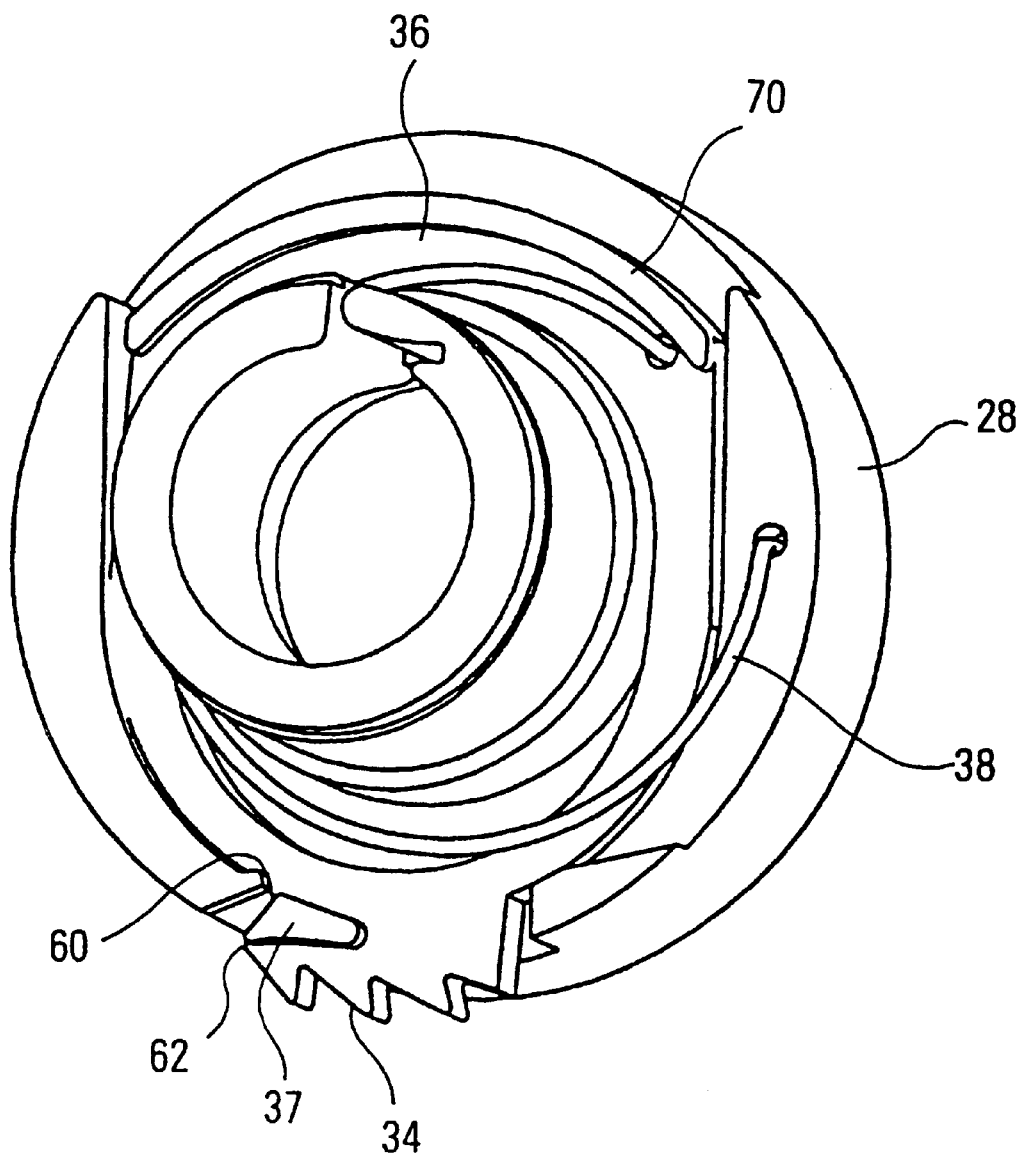
FIG. 6 shows in a perspective view the driving part together with the release mechanism of FIG. 5 in a second position.
Figure 7:
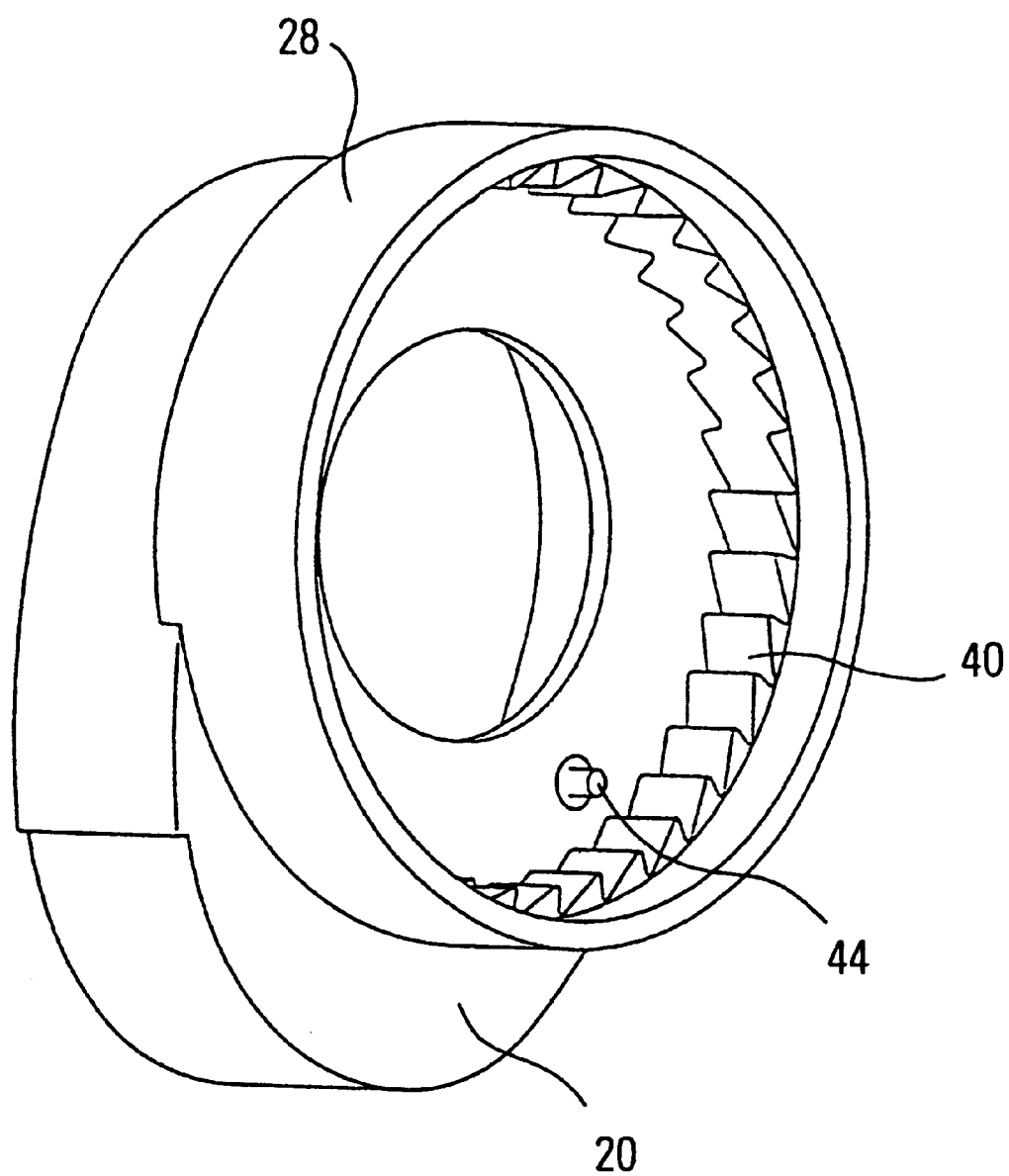
FIG. 7 shows in a perspective view the housing surrounding the driving part of FIG. 5.

In FIGS. 5 to 7, the driving part and the housing are illustrated for an assembly according to a second embodiment of the invention. For structural elements which are known from the first embodiment with regard to their function or their structure, the same reference numbers are used here.

In contrast to the first embodiment, the locking catch 34 here is not mounted pivotally on the driving part 28, but rather so as to be displaceable in a translator manner in radial direction. For this purpose, a slider 36 is connected with the locking catch 34, which slider 36 embraces the central hub of the driving part 28 and on the opposite side to the locking catch 34 with respect to the rotation axis of the driving part is provided with a counterweight 70. Owing to the counterweight 70 and the construction of the slider 36, the overall mass center of the unit formed by the locking catch 34, the slider 36 and the counterweight 70 with respect to the rotation axis is situated on the side opposed to the locking catch, i.e. on the side of the counterweight 70.

A leg spring 38 is provided, which is suspended by one end on the driving part 28 and by the other end on the slider 36. The leg spring acts on the slider 36 and therefore also on the locking catch 34 from the position shown in FIG. 5, in which the locking catch 34 does not engage into the locking toothing 40, with respect to FIG. 5 downwards into the position shown in FIG. 6, in which the locking catch 34 engages into the locking toothing 40.

On the locking catch 34 a nose 37 is provided, which lies against the holding pin 44 (see FIG. 7). The holding pin therefore counteracts the action of the slider 36 exerted by the spring 38. In addition, on the driving part a holding surface 60 is formed, which co-operates with a projection 62 formed on the locking catch 34 so that it counteracts a displacement of the locking catch 34 in radial direction outwards. The holding surface 60 and the projection 62 together are not alone able to keep the locking catch 34 in the position shown in FIG. 5 contrary to the action of the spring 38.

If such a torque is exerted onto the driving part 28 that a rotation of the driving part 28 occurs in the direction of the arrow D relative to the housing 20, the holding pin 44, which is constructed elastically, is pushed radially outwards by the nose 37 of the locking catch 34. With a further relative rotation, this is supported by a slope 50 which is formed on the driving part 28 and adjoins the nose 37. Through the nose 37 and the slope 50, the holding pin 44 is bent so far outwards that it remains in this position.

As soon as the holding pin 44 no longer lies against the nose 37, the holding pin can not provide any further force which counteracts the force exerted by the spring 38. Of course, this state is only reached when a certain rotational speed of the driving part is already reached, so that the centrifugal force then acting on the overall mass center together with the holding force provided by the holding surface 60 and the projection 62 counteracts the force exerted by the spring 38, so that the locking catch 34 remains in its position shown in FIG. 5. Only when the rotation speed of the driving part decreases and thereby also the centrifugal force acting on the overall mass center also decreases, is the spring 38 able to move the locking catch 34 radially outwards into the locking toothing. Now the force limiting function is disconnected and the belt spool 12 is directly blocked.

What is claimed is:

1. An assembly comprising:
   a belt retractor for a vehicle safety belt,
   a force limiter,
   said belt retractor having a belt spool,
   said force limiter having a housing and a driving part coupled with said belt spool,
   said assembly comprising a locking catch connected with said driving part,
   a release mechanism for said locking catch, and
   a stationary locking toothing,
   said release mechanism being activated by a relative rotation between said driving part and said housing of said force limiter,
   said release mechanism, towards an end of said relative rotation, releasing said locking catch into engagement with said locking toothing with the termination of a force limiting function whereby said belt spool is locked against a rotation in a belt webbing withdrawal direction relative to said locking toothing.

2. The assembly of claim 1, wherein said locking toothing is arranged on said housing of said force limiter.

3. The assembly of claim 1, wherein a locking catch is arranged on said belt spool, which engages a locking toothing arranged on said driving part such that said belt spool is coupled with said driving part.

4. The assembly of claim 1, wherein said release mechanism is arranged on said driving part.

5. The assembly of claim 1, wherein said force limiter comprises a metal band which is connected with said driving part and with a relative rotation between said driving part and said housing is drawn through a guideway.

6. The assembly of claim 1, wherein said locking catch is mounted on said driving part.

7. The assembly of claim 6, wherein saod release mechanism comprises a spring which is prestressed so that it biases said locking catch into said locking toothing.

8. The assembly of claim 7, wherein said release mechanism comprises a cage which is rotatable relative to said driving part from an initial position in which said locking catch does not engage into said locking toothing, into an activated position in which said locking catch is engaged into said locking toothing.

9. The assembly of claim 7, wherein a holding pin is provided which is arranged on said housing and is elastic, a nose being arranged on said locking catch, against which said holding pin lies and holds said locking catch, contrary to a force exerted by said spring, in a position not engaged into said locking toothing.

10. The assembly of claim 8, wherein a holding pin holds said cage in said initial position and engages into a mounting in said housing of said force limiter to shear off said holding pin upon a relative rotation between said driving part and said housing of said force limiter, whereby said release mechanism is activated.

11. The assembly of claim 10, wherein a nose is provided on said locking catch, which co-operates with a slope formed on said driving part so that with a rotation of said cage from said initial position into said activated position said locking catch is caused to engage into said locking toothing.

12. An assembly comprising:
   a belt retractor having a belt spool for a vehicle safety belt said belt spool being rotatable in a belt winding direction and a belt unwinding direction;
   a first locking catch for locking said spool from rotation in the belt unwinding direction;
   a force limiter, separate from said belt retractor, and having a housing and a driving part coupled with said belt spool;
   said force limiter having a force limiting function limiting the rotation of said belt spool in said belt unwinding direction when said first locking catch locks said belt spool from rotation and a force above a predetermined force is applied to the safety belt;
   a second locking catch connected with said driving part,
   a locking toothing located on said housing;
   a release mechanism for moving said second locking catch between a position not engaging said locking toothing and a position engaging said locking toothing,
   said release mechanism moving said second locking catch into engagement with said locking toothing after a completion of said force limiting function to prevent further rotation of said belt spool in a belt unwinding direction relative to said locking toothing after completion of said force limiting function.

13. An assembly comprising:

a belt retractor for a vehicle safety belt, and a force limiter, said belt retractor having a belt spool, said force limiter having a housing and a driving part coupled with said belt spool, said assembly comprising a locking catch connected with said driving part, a release mechanism for said locking catch, and a stationary locking toothing, said release mechanism being activated by a relative rotation between said driving part and said housing of said force limiter, said release mechanism, towards an end of said relative rotation, releasing said locking catch into engagement with said locking toothing whereby said belt spool is locked against a rotation in a belt webbing withdrawal direction relative to said locking toothing, said locking catch being mounted on said driving part, said release mechanism comprising a prestressed spring biasing said locking catch into said locking toothing, said locking catch being arranged on a slider, the mass and geometry of which are selected such that the overall mass center of said locking catch and said slider lies on a side of a rotation axis of said driving part facing away from said locking catch.

14. An assembly comprising:

a belt retractor for a vehicle safety belt, and a force limiter, said belt retractor having a belt spool, said force limiter having a housing and a driving part coupled with said belt spool, said assembly comprising a locking catch connected with said driving part, a release mechanism for said locking catch, and a stationary locking toothing, said release mechanism being activated by a relative rotation between said driving part and said housing of said force limiter, said release mechanism, towards an end of said relative rotation, releasing said locking catch into engagement with said locking toothing whereby said belt spool is locked against a rotation in a belt webbing withdrawal direction relative to said locking toothing, said locking catch being mounted on said driving part, said release mechanism comprising a prestressed spring biasing said locking catch into said locking toothing, said locking catch being arranged on a slider, the mass and geometry of which are selected such that the overall mass center of said locking catch and said slider lies on a side of a rotation axis of said driving part facing away from said locking catch, said housing having an elastic holding pin, said locking catch having a nose lying against and holding said holding pin contrary to a force exerted by said spring in a position not engaged into said locking toothing, said driving part having a slope adjoining said nose of said locking catch and deflecting said holding pin outwards when said driving part is rotated relative to said housing.

15. An assembly comprising:

a belt retractor for a vehicle safety belt, and a force limiter, said belt retractor having a belt spool, said force limiter having a housing and a driving part coupled with said belt spool, said assembly comprising a locking catch connected with said driving part, a release mechanism for said locking catch, and a stationary locking toothing, said release mechanism being activated by a relative rotation between said driving part and said housing of said force limiter, said release mechanism, towards an end of said relative rotation, releasing said locking catch into engagement with said locking toothing whereby said belt spool is locked against a rotation in a belt webbing withdrawal direction relative to said locking toothing, said locking catch being mounted on said driving part, said release mechanism comprising a prestressed spring biasing said locking catch into said locking toothing, said locking catch being arranged on a slider, the mass and geometry of which are selected such that the overall mass center of said locking catch and said slider lies on a side of a rotation axis of said driving part facing away from said locking catch, said housing having an elastic holding pin, said locking catch having a nose lying against and holding said holding pin contrary to a force exerted by said spring in a position not engaged into said locking toothing, said driving part having a holding surface, said locking catch having a projection, said projection engaging behind said holding surface when said locking catch is in a position not engaged into said locking toothing.

* * * * *